United States Patent
Shavell et al.

(10) Patent No.: US 10,178,122 B1
(45) Date of Patent: Jan. 8, 2019

(54) SYSTEMS AND METHODS FOR DISSEMINATING LOCATION-BASED REPUTATIONS FOR LINK-LAYER WIRELESS ATTACKS

(71) Applicant: Symantec Corporation, Mountain View, CA (US)

(72) Inventors: Michael Shavell, Merrimack, NH (US); Kevin Jiang, San Mateo, CA (US)

(73) Assignee: Symantec Corporation, Mountain View, CA (US)

( * ) Notice: Subject to any disclaimer, the term of this patent is extended or adjusted under 35 U.S.C. 154(b) by 189 days.

(21) Appl. No.: 15/236,033

(22) Filed: Aug. 12, 2016

(51) Int. Cl.
*H04L 29/06* (2006.01)
*H04W 64/00* (2009.01)
*H04W 12/08* (2009.01)
*H04W 76/10* (2018.01)
*H04W 80/02* (2009.01)

(52) U.S. Cl.
CPC ...... *H04L 63/1441* (2013.01); *H04L 63/1416* (2013.01); *H04W 12/08* (2013.01); *H04W 64/00* (2013.01); *H04W 76/10* (2018.02); *H04W 80/02* (2013.01)

(58) Field of Classification Search
CPC .......... H04L 63/1441; H04L 63/1416; H04W 76/10; H04W 12/08; H04W 64/00; H04W 80/02
See application file for complete search history.

(56) References Cited

U.S. PATENT DOCUMENTS

| | | | | |
|---|---|---|---|---|
| 7,856,209 B1 * | 12/2010 | Rawat | ....................... | G01S 5/02 370/338 |
| 8,005,457 B2 * | 8/2011 | Jones | ..................... | H04L 12/14 455/406 |
| 8,621,654 B2 * | 12/2013 | Nachenberg | ............ | G06F 21/33 726/21 |

(Continued)

OTHER PUBLICATIONS

Using Spoofed Wi-fi to attack mobile devices, Apr. 21, 2016, David Richardson, https://blog.lookout.com/spoofed-wifi-60-minutes (Year: 2016).*

(Continued)

*Primary Examiner* — Robert B Leung
*Assistant Examiner* — Thomas Ho
(74) *Attorney, Agent, or Firm* — Fisher Broyles, LLP

(57) ABSTRACT

The disclosed computer-implemented method for disseminating location-based reputations for link-layer wireless attacks may include (i) receiving, at a server from a first wireless client, a wireless-attack report for a location that includes (a) information that indicates that the first wireless client detected a link-layer wireless attack (e.g., a wireless-access-point spoofing attack or a deauthentication attack) at the location or (b) information that indicates that the first wireless client did not detect any link-layer wireless attacks at the location, (ii) using, at the server, the wireless-attack report to generate a reputation for link-layer wireless attacks for the location, (iii) receiving, at the server from a second wireless client, a request for the reputation of the location, and (iv) responding to the request with the reputation of the location. Various other methods, systems, and computer-readable media are also disclosed.

20 Claims, 7 Drawing Sheets

(56) References Cited

U.S. PATENT DOCUMENTS

| | | | | |
|---|---|---|---|---|
| 8,646,074 B1* | 2/2014 | Gangadharan | ........ | H04W 12/12 |
| | | | | 726/22 |
| 9,002,333 B1* | 4/2015 | Tong | .................... | H04M 3/4211 |
| | | | | 379/142.06 |
| 9,398,036 B2* | 7/2016 | Sim | ..................... | H04L 63/1416 |
| 9,497,585 B1 | 11/2016 | Cooley et al. | | |
| 2009/0327736 A1* | 12/2009 | Cam-Winget | ........ | H04L 63/061 |
| | | | | 713/181 |

OTHER PUBLICATIONS

LVS: a WiFi based system to tackle location spoofing in location based services, pp. 1-4, Restuccia et al. IEEE, Jun. 24, 2016 (Year: 2016).*

Justin Worland; This Hotel Allegedly Blocked Your Wi-Fi Hotspot; http://time.com/3461725/marriott-600k-penalty-wifi-blocking/; Oct. 3, 2014.

Beware the Pineapple: An overview of WiFi Pineapple Mark V; http://volkanpaksoy.com/archive/2015/02/25/beware-the-pineapple-an-overview-of-wifi-pineapple-mark-v/; Feb. 25, 2015.

Kevin Jiang et al.; Systems and Methods for Preventing Tracking of Mobile Devices; U.S. Appl. No. 14/862,181, filed Sep. 23, 2015.

Jin Lu; Systems and Methods for Connecting Internet-Connected Devices to Wireless Access Points; U.S. Appl. No. 14/850,985, filed Sep. 11, 2015.

Ankit Kurani; Systems and Methods for Detecting Potentially Illegitimate Wireless Access Points; U.S. Appl. No. 14/732,811, filed Jun. 8, 2015.

Justin Harmon; Systems and Methods for Detecting Potentially Illegitimate Wireless Access Points; U.S. Appl. No. 14/608,218, filed Jan. 29, 2015.

Ajitesh RoyChowdhury et al.; Systems and Methods for Determining Security Reputations of Wireless Network Access Points; U.S. Appl. No. 15/231,714, filed Aug. 8, 2016.

* cited by examiner

SYSTEMS AND METHODS FOR DISSEMINATING LOCATION-BASED REPUTATIONS FOR LINK-LAYER WIRELESS ATTACKS

BACKGROUND

Wireless access points may provide users of internet-enabled devices with efficient and/or widespread access to wired network connections. To facilitate efficient connections to wireless access points, many computing devices may remember the configuration details of a wireless access point after connecting to the wireless access point for the first time. When re-entering the range of the wireless access point, a computing device may request access to the wireless access point and quickly re-connect.

When initially establishing a connection to a wireless access point, a computing device may store information that identifies the wireless access point and/or the network to which the wireless access point provides access. In particular, the computing device may store the Service Set IDentifier (SSID), the Basic Service Set IDentifier (BSSID), or Media Access control (MAC) address of the wireless access point. The computing device may later use this information to attempt to re-connect to the (now known) wireless access point. For example, when not connected to the known wireless access point, the computing device may be configured to automatically and periodically (e.g., every half second, every minute, etc.) transmit a request to connect to the known wireless access point. Specifically, when not connected to the known wireless access point, the computing device may repeatedly transmit probe requests (via an 802.11 protocol) that contain the SSID or BSSID of the known wireless access point. If the known wireless access point receives a probe request directed to it, the wireless access point may respond with a probe response that contains the SSID or BSSID of the known wireless access point. When the computing device receives a probe response from the known wireless access point, the computing device may attempt to re-connect to the known wireless access point.

Unfortunately, traditional technologies for connecting computing devices to wireless access points may have certain security deficiencies that may leave the computing devices vulnerable to various link-layer wireless attacks. For example, conventional network security systems may fail to provide any reliable and/or trusted techniques for computing devices to verify the legitimacy and/or identity of wireless access points. As a result, an attacker may configure a malicious device (e.g., a so-called WIFI PINEAPPLE) to mimic or spoof a wireless access point known to a computing device. For example, the attacker may configure the malicious device to respond to a computing device's probe requests as if the malicious device was a wireless access point known to the computing device. Since the malicious device acts like a known wireless access point, the computing device may connect to the malicious device as if it was the known wireless access point. After the computing device connects to the malicious device, the attacker may view all network traffic sent to and from the computing device. Some computing devices may be capable of detecting link-layer wireless attacks, however, some computing devices (e.g., mobile devices with restricted operating systems) may be less capable or unable to do so. The instant disclosure, therefore, identifies and addresses a need for systems and methods for disseminating location-based reputations for link-layer wireless attacks.

SUMMARY

As will be described in greater detail below, the instant disclosure describes various systems and methods for disseminating location-based reputations for link-layer wireless attacks. In one example, a system for disseminating location-based reputations for link-layer wireless attacks may include several modules stored in memory, including (i) a report-receiving module that receives, at a server from a first wireless client, a wireless-attack report for a location that includes (a) information that indicates that the first wireless client detected a link-layer wireless attack (e.g., a wireless-access-point spoofing attack or a deauthentication attack) at the location or (b) information that indicates that the first wireless client did not detect any link-layer wireless attacks at the location, (ii) a reputation-generating module, stored in memory, that uses, at the server, the wireless-attack report to generate a reputation for link-layer wireless attacks for the location, (iii) a request-receiving module, stored in memory, that receives, at the server from a second wireless client, a request for the reputation of the location, and (iv) a responding module, stored in memory, that responds to the request with the reputation of the location. In some examples, the system may also include at least one physical processor that executes the report-receiving module, the reputation-generating module, the request-receiving module, and the responding module.

In one embodiment, a method for disseminating location-based reputations for link-layer wireless attacks may include (i) receiving, at a server from a first wireless client, a wireless-attack report for a location that includes (a) information that indicates that the first wireless client detected a link-layer wireless attack at the location or (b) information that indicates that the first wireless client did not detect any link-layer wireless attacks at the location, (ii) using, at the server, the wireless-attack report to generate a reputation for link-layer wireless attacks for the location, (iii) receiving, at the server from a second wireless client, a request for the reputation of the location, and (iv) responding to the request with the reputation of the location.

In some examples, the method may further include (i) determining, at the first wireless client, a location of the first wireless client, (ii) detecting, at the first wireless client, the link-layer wireless attack, (iii) generating, at the first wireless client, the wireless-attack report to include (a) information that identifies the location of the first wireless client and (b) information that describes the link-layer wireless attack, and (iv) transmitting, from the first wireless client, the wireless-attack report to the server. In other examples, the method may further include (i) determining, at the first wireless client, a location of the first wireless client, (ii) attempting, at the first wireless client, to detect one or more link-layer wireless attacks at the location of the first wireless client, (iii) determining, at the first wireless client, that no link-layer wireless attacks are occurring at the location of the first wireless client, (iv) generating, at the first wireless client, the wireless-attack report to include (a) information that identifies the location of the first wireless client and (b) information that indicates that no link-layer wireless attacks are occurring at the location of the first wireless client, and (v) transmitting, from the first wireless client, the wireless-attack report to the server.

In some examples, the method may further include (i) determining, at the second wireless client, the location of the second wireless client, (ii) querying, at the second wireless client before connecting to a wireless access point at the location of the second wireless client, the server for a reputation for link-layer wireless attacks for the location of the second wireless client, and (iii) performing, at the second wireless client, a security action in response to receiving a poor reputation for the location of the second wireless client. In one example, the step of performing the security action may include (i) warning a user of the second wireless client of a risk of connecting to the wireless access point, (ii) preventing the second wireless client from auto connecting to the wireless access point, and/or (iii) preventing the second wireless client from connecting to the wireless access point.

In at least one example, the method may further include (i) determining, at the second wireless client, the location of the second wireless client, (ii) querying, at the second wireless client before connecting to a wireless access point at the location of the second wireless client, the server for a reputation for link-layer wireless attacks for the location of the second wireless client, and (iii) connecting, at the second wireless client, to the wireless access point in response to receiving a good reputation for the location of the second wireless client.

In some examples, the method may further include receiving, at the server from one or more additional wireless clients, one or more additional wireless-attack reports for the location, and the step of using the wireless-attack report to generate the reputation for the location may include using, at the server, the one or more additional wireless-attack reports to generate the reputation for the location. In another example, the method may further include maintaining, at the server, a reputation for making false reports for the first wireless client, and the wireless-attack report may be used to generate the reputation for link-layer wireless attacks for the location based at least in part on the reputation of the first wireless client indicating that the first wireless client does not make false reports.

In some examples, the above-described method may be encoded as computer-readable instructions on a non-transitory computer-readable medium. For example, a computer-readable medium may include one or more computer-executable instructions that, when executed by at least one processor of a computing device, may cause the computing device to (i) receive, at a server from a first wireless client, a wireless-attack report for a location that includes (a) information that indicates that the first wireless client detected a link-layer wireless attack at the location or (b) information that indicates that the first wireless client did not detect any link-layer wireless attacks at the location, (ii) use, at the server, the wireless-attack report to generate a reputation for link-layer wireless attacks for the location, (iii) receive, at the server from a second wireless client, a request for the reputation of the location, and (iv) respond to the request with the reputation of the location.

Features from any of the above-mentioned embodiments may be used in combination with one another in accordance with the general principles described herein. These and other embodiments, features, and advantages will be more fully understood upon reading the following detailed description in conjunction with the accompanying drawings and claims.

BRIEF DESCRIPTION OF THE DRAWINGS

The accompanying drawings illustrate a number of example embodiments and are a part of the specification. Together with the following description, these drawings demonstrate and explain various principles of the instant disclosure.

Figure 1:
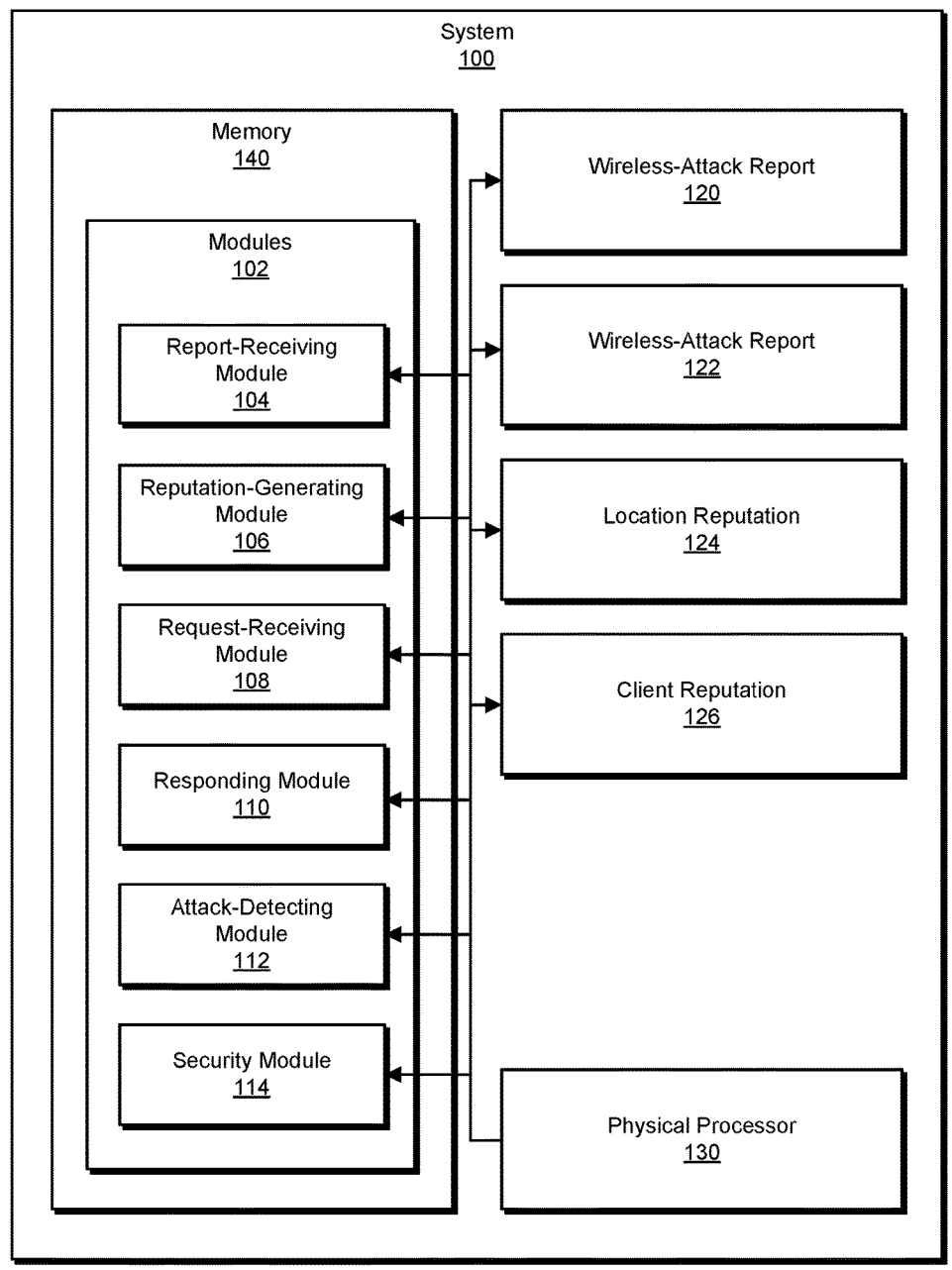
FIG. 1 is a block diagram of an example system for disseminating location-based reputations for link-layer wireless attacks.

Throughout the drawings, identical reference characters and descriptions indicate similar, but not necessarily identical, elements. While the example embodiments described herein are susceptible to various modifications and alternative forms, specific embodiments have been shown by way of example in the drawings and will be described in detail herein. However, the example embodiments described herein are not intended to be limited to the particular forms disclosed. Rather, the instant disclosure covers all modifications, equivalents, and alternatives falling within the scope of the appended claims.

DETAILED DESCRIPTION OF EXAMPLE EMBODIMENTS

The present disclosure is generally directed to systems and methods for disseminating location-based reputations for link-layer wireless attacks. As will be explained in greater detail below, by maintaining a location-based reputation for link-layer wireless attacks for a location based on whether one or more wireless clients have or have not detected link-layer wireless attacks at the location, the systems and methods described herein may disseminate the location-based reputations to additional wireless clients that find themselves at the location and that are unsure of the safety of connecting to wireless access points at the location. Furthermore, in some examples, by disseminating a location-based reputation to a wireless client that finds itself at a particular location and needing to connect to a wireless access point, these systems and methods may enable the wireless client to judge whether it is safe to do so.

In addition, the systems and methods described herein may improve the functioning of a computing device by enabling the computing device to determine the likelihood of experiencing a link-layer wireless attack at a particular location thus reducing the computing device's likelihood of experiencing link-layer wireless attacks. These systems and methods may also improve the field of wireless security by reducing the likelihood that wireless clients will connect to illegitimate wireless access points. Embodiments of the instant disclosure may also provide various other advantages and features, as discussed in greater detail below.

Figure 2:
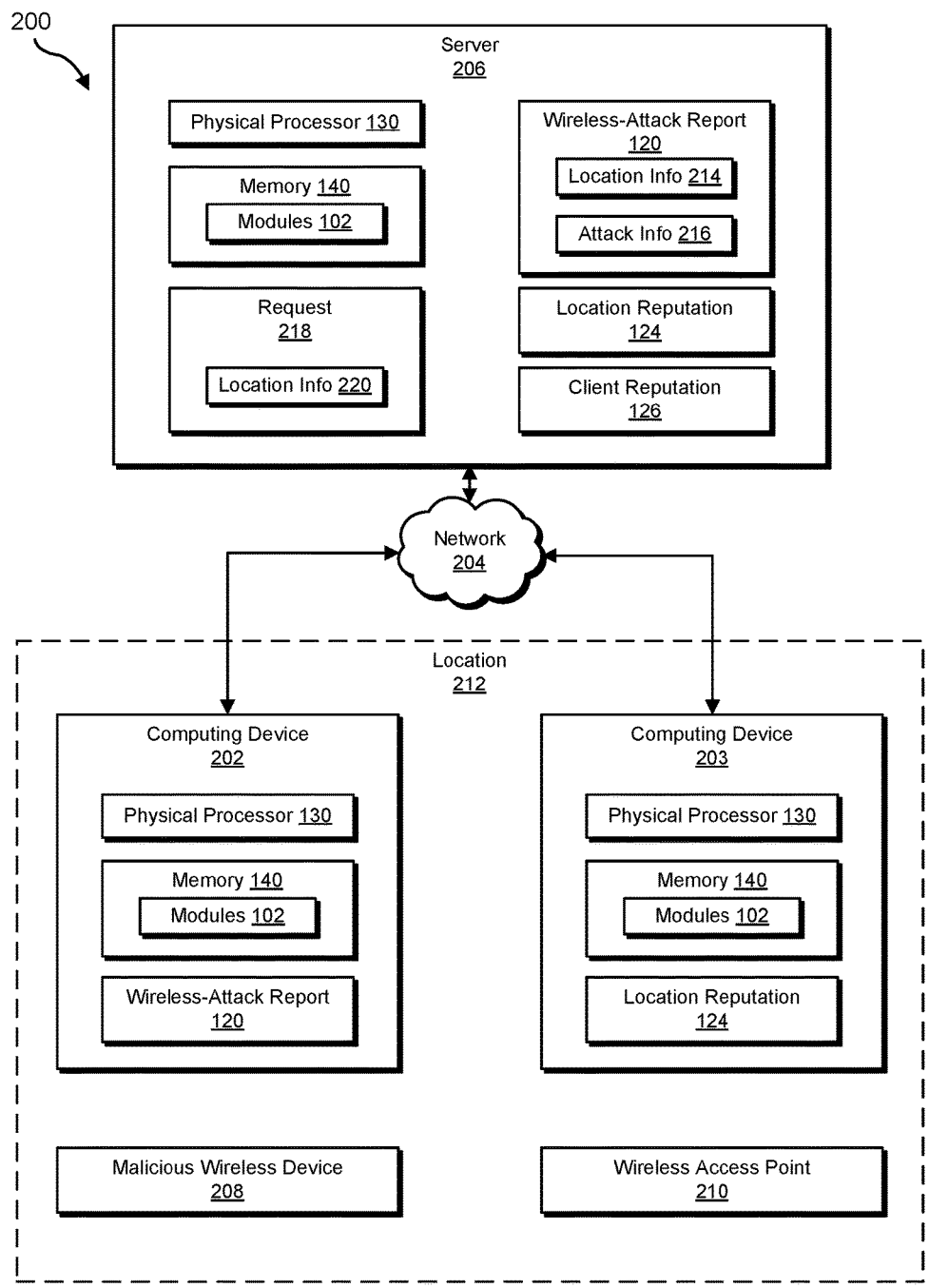
FIG. 2 is a block diagram of an additional example system for disseminating location-based reputations for link-layer wireless attacks.

The following will provide, with reference to FIGS. 1-2, detailed descriptions of example systems for disseminating location-based reputations for link-layer wireless attacks. Detailed descriptions of corresponding computer-implemented methods will also be provided in connection with FIG. 3-5. Finally, detailed descriptions of an exemplary computing system and network architecture capable of implementing one or more of the embodiments described herein will be provided in connection with FIGS. 6 and 7, respectively.

FIG. 1 is a block diagram of an example system 100 for disseminating location-based reputations for link-layer wireless attacks. As illustrated in this figure, example system 100 may include one or more modules 102 for performing one or more tasks. As will be explained in greater detail below, modules 102 may include a report-receiving module 104, a reputation-generating module 106, a request-receiving module 108, a responding module 110, an attack-detecting module 112, and a security module 114. Although illustrated as separate elements, one or more of modules 102 in FIG. 1 may represent portions of a single module or application.

In certain embodiments, one or more of modules 102 in FIG. 1 may represent one or more software applications or programs that, when executed by a computing device, may cause the computing device to perform one or more tasks. For example, and as will be described in greater detail below, one or more of modules 102 may represent modules stored and configured to run on one or more computing devices, such as the devices illustrated in FIG. 2 (e.g., computing device 202, computing device 203, and/or server 206). One or more of modules 102 in FIG. 1 may also represent all or portions of one or more special-purpose computers configured to perform one or more tasks.

As illustrated in FIG. 1, example system 100 may also include one or more memory devices, such as memory 140. Memory 140 generally represents any type or form of volatile or non-volatile storage device or medium capable of storing data and/or computer-readable instructions. In one example, memory 140 may store, load, and/or maintain one or more of modules 102. Examples of memory 140 include, without limitation, Random Access Memory (RAM), Read Only Memory (ROM), flash memory, Hard Disk Drives, (HDDs), Solid-State Drives (SSDs), optical disk drives, caches, variations or combinations of one or more of the same, and/or any other suitable storage memory.

As illustrated in FIG. 1, example system 100 may also include one or more physical processors, such as physical processor 130. Physical processor 130 generally represents any type or form of hardware-implemented processing unit capable of interpreting and/or executing computer-readable instructions. In one example, physical processor 130 may access and/or modify one or more of modules 102 stored in memory 140. Additionally or alternatively, physical processor 130 may execute one or more of modules 102 to facilitate disseminating location-based reputations for link-layer wireless attacks. Examples of physical processor 130 include, without limitation, microprocessors, microcontrollers, Central Processing Units (CPUs), Field-Programmable Gate Arrays (FPGAs) that implement softcore processors, Application-Specific Integrated Circuits (ASICs), portions of one or more of the same, variations or combinations of one or more of the same, and/or any other suitable physical processor.

As illustrated in FIG. 1, example system 100 may also include one or more wireless-attack reports, location reputations, and client reputations. Wireless-attack reports 120 and 122 generally represent any type or form of information that is sent from a wireless client device to a reputation server and that indicates that the wireless client device either detected or did not detect a link-layer wireless attack at a particular location. In one example, wireless-attack report 120 and/or wireless-attack report 122 may include information that identifies a location that was scanned for link-layer wireless attacks (e.g., Global Positioning System (GPS) coordinates of the location), information that indicates the types of link-layer wireless attacks that were scanned for, and/or information that indicates whether any link-layer wireless attacks were detected.

Location reputation 124 generally represents any type or form of information that represents a location's reputation for link-layer wireless attacks and/or a likelihood that a link-layer wireless attack will occur at a location. The phrase "reputation for link-layer wireless attacks," as used herein, generally refers to any type or kind of rating that indicates likelihood that a link-layer wireless attack will occur at an associated location and/or that indicates how safe it is to connect to wireless access points at an associated location. In some examples, the systems described herein may represent a reputation for link-layer wireless attacks using a number (e.g., a number of attacks), a phrase, or keyword, a heat map (i.e., a graphical representation of data where values are represented as colors or other markings), any kind of map or geographical representation used to describe the reputation of one or more locations, any kind of symbol or imagery used to indicate the reputation of a location, or any other representation used to depict, categorize, and/or indicate the link-layer wireless attacks at a location. Client reputation 126 generally represents any type of form of information that represents a wireless client's reputation for making false reports of link-layer wireless attacks and/or a likelihood that a wireless-attack report that is received from a wireless client is accurate.

Example system 100 in FIG. 1 may be implemented in a variety of ways. For example, all or a portion of example system 100 may represent portions of example system 200 in FIG. 2. As shown in FIG. 2, system 200 may include a computing device 202, a computing device 203, and a server 206 in communication via a network 204. In one example, all or a portion of the functionality of modules 102 may be performed by computing device 202, computing device 203, server 206, and/or any other suitable computing system. As will be described in greater detail below, one or more of modules 102 from FIG. 1 may, when executed by at least one processor of computing device 202, computing device 203, and/or server 206, enable computing device 202, computing device 203, and/or server 206 to disseminate location-based reputations for link-layer wireless attacks.

Computing device 202 and computing device 203 generally represent any type or form of computing device capable of reading computer-executable instructions. In some examples, computing device 202 may represent a wireless device that is capable of detecting link-layer wireless attacks, and computing device 203 may represent a wireless device that is less capable of detecting or unable to detect link-layer wireless attacks. Examples of computing device 202 and computing device 203 include, without limitation, laptops, tablets, desktops, servers, cellular phones, Personal Digital Assistants (PDAs), multimedia players, embedded systems, wearable devices (e.g., smart watches, smart glasses, etc.), gaming consoles, variations or combinations of one or more of the same, and/or any other suitable computing device.

As shown in FIG. 2, computing devices 202 and 203 may be or may have been at a location 212. Location 212 generally represents a geographic location. The terms "location" and "geographic location," as used herein, generally refer to any type or form of physical place, area, or region in which a computing device and/or network device may be temporarily or permanently located. Examples of geographic locations include, without limitation, GPS coordinates, boundaries defined by a set of GPS coordinates, street addresses, particular buildings, neighborhoods, cities, states, countries, territories, provinces, counties, area codes, and/or zip codes.

Server 206 generally represents any type or form of computing device that is capable of reading computer-executable instructions. In some examples, server 206 may represent a reputation server that maintains location-based reputations for link-layer wireless attacks and/or services reputation lookups. Additional examples of server 206 include, without limitation, security servers, application servers, web servers, storage servers, and/or database servers configured to run certain software applications and/or provide various security, web, storage, and/or database services. Although illustrated as a single entity in FIG. 2, server 206 may include and/or represent a plurality of servers that work and/or operate in conjunction with one another. As shown, server 206 may include a request 218 that was received from computing device 203. Request 218 generally represents any type or form of request for a reputation of link-layer wireless attacks for a particular specified location. In this example, request 218 includes location information 220 (e.g., GPS coordinates) that specifies the location whose reputation is being requested.

Wireless access point 210 generally represents any type or form of physical or virtual wireless access point. The term "wireless access point," as used herein, generally refers to any device and/or portion of executable code that enables a computing device to wirelessly connect to a wired network. In some examples, a wireless access point may receive a request from a computing device to access the wireless access point and/or a network to which the wireless access point provides access. The wireless access point may then facilitate the process of connecting the computing device to the network. In some embodiments, a wireless access point may reside within a router, switch, or other network device. In other embodiments, a wireless access point may represent a separate physical device. In at least one example, the term "wireless access point" may refer to any device (e.g., a Bluetooth-enabled device) that enables another device to connect to it wirelessly.

Malicious wireless device 208 generally represents a malicious network device (e.g., a WiFi Pineapple device) that may emulate or replicate a legitimate or benign wireless access point (e.g., wireless access point 210). In some examples, in response to transmitting a request to connect to wireless access point 210, computing devices at location 212 may receive a communication from malicious wireless device 208 in which malicious wireless device 208 alleges to be wireless access point 210. Malicious wireless device 208 may "allege" to be a particular wireless access point by claiming to be, resembling, or otherwise displaying the characteristics of the particular wireless access point. In some examples, malicious wireless access point 208 may illegitimately or falsely allege to be another wireless access point by providing information (e.g., a SSID) that identifies the other wireless access point.

Network 204 generally represents any medium or architecture capable of facilitating communication or data transfer. In one example, network 204 may facilitate communication between computing device 202, computing device 203, and server 206. In this example, network 204 may facilitate communication or data transfer using wireless and/or wired connections. Examples of network 204 include, without limitation, an intranet, a Wide Area Network (WAN), a Local Area Network (LAN), a Personal Area Network (PAN), the Internet, Power Line Communications (PLC), a cellular network (e.g., a Global System for Mobile Communications (GSM) network), portions of one or more of the same, variations or combinations of one or more of the same, and/or any other suitable network.

Figure 3:
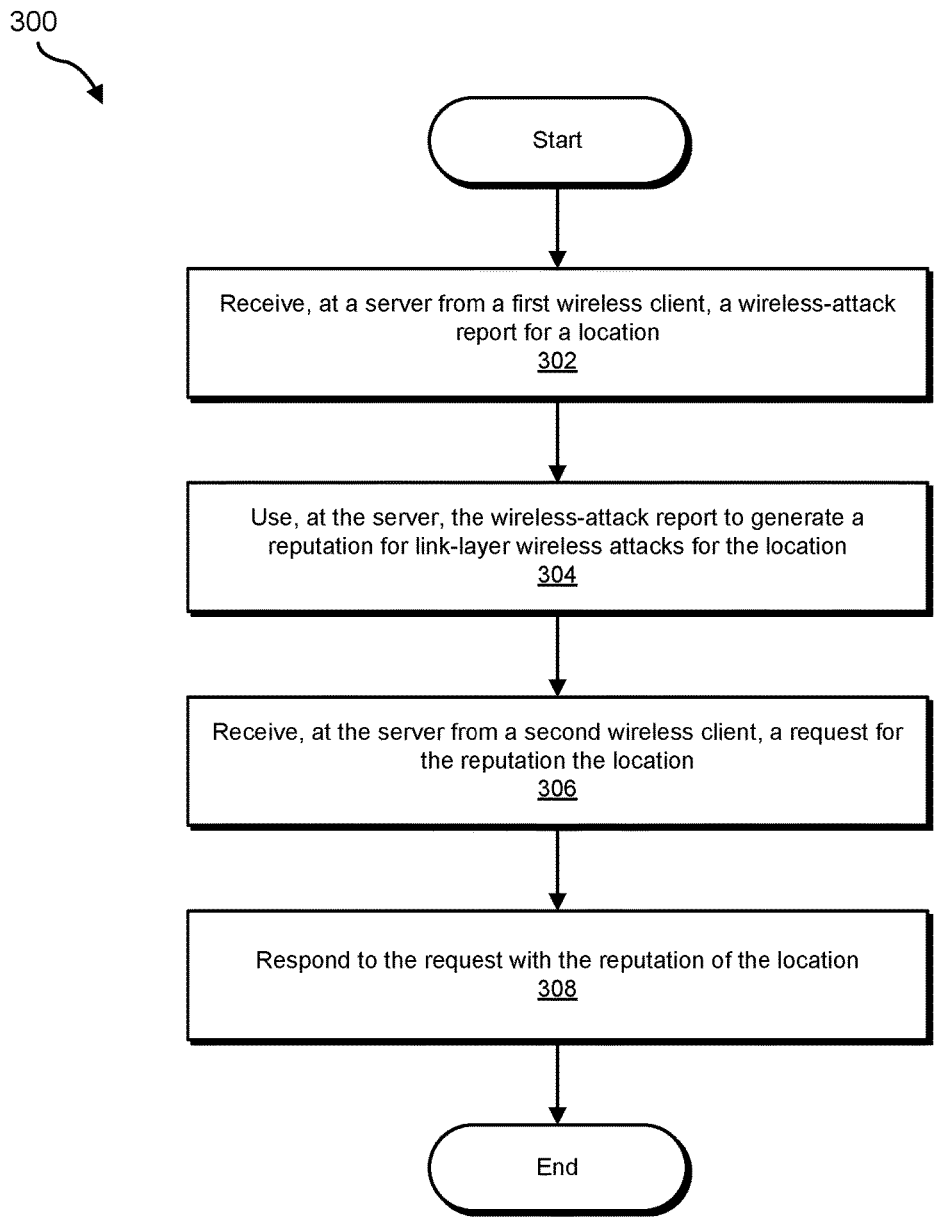
FIG. 3 is a flow diagram of an example method for disseminating location-based reputations for link-layer wireless attacks.

FIG. 3 is a flow diagram of an example computer-implemented method 300 for disseminating location-based reputations for link-layer wireless attacks. The steps shown in FIG. 3 may be performed by any suitable computer-executable code and/or computing system, including system 100 in FIG. 1, system 200 in FIG. 2, and/or variations or combinations of one or more of the same. In one example, each of the steps shown in FIG. 3 may represent an algorithm whose structure includes and/or is represented by multiple sub-steps, examples of which will be provided in greater detail below.

As illustrated in FIG. 3, at step 302 one or more of the systems described herein may receive, at a server from a first wireless client, a wireless-attack report for a location. For example, report-receiving module 104 may, as part of server 206 in FIG. 2, receive wireless-attack report 120 for location 212 from computing device 202.

The systems described herein may receive wireless-attack reports in any suitable manner. In one example, report-receiving module 104 may receive, as part of a centralized reputation service, wireless-attack reports from one or more wireless clients that are capable of scanning for, detecting, and reporting link-layer wireless attacks. As used herein, the term "link-layer wireless attack" generally refers to any malicious attack that is completely or partially perpetrated using the data link layer of a wireless protocol (e.g., a WiFi or Bluetooth protocol). Examples of link-layer wireless attacks include, without limitation, WiFi access point spoofing attacks, Karma attacks, Pineapple attacks, evil twin attacks, SSID spoofing attacks, MITM (Man In The Middle) attacks, deauthentication attacks, wireless stack exploits (e.g., buffer overflows), and/or any wireless attack that occurs before or as part of establishing a connection between a wireless client and a wireless access point.

Figure 4:
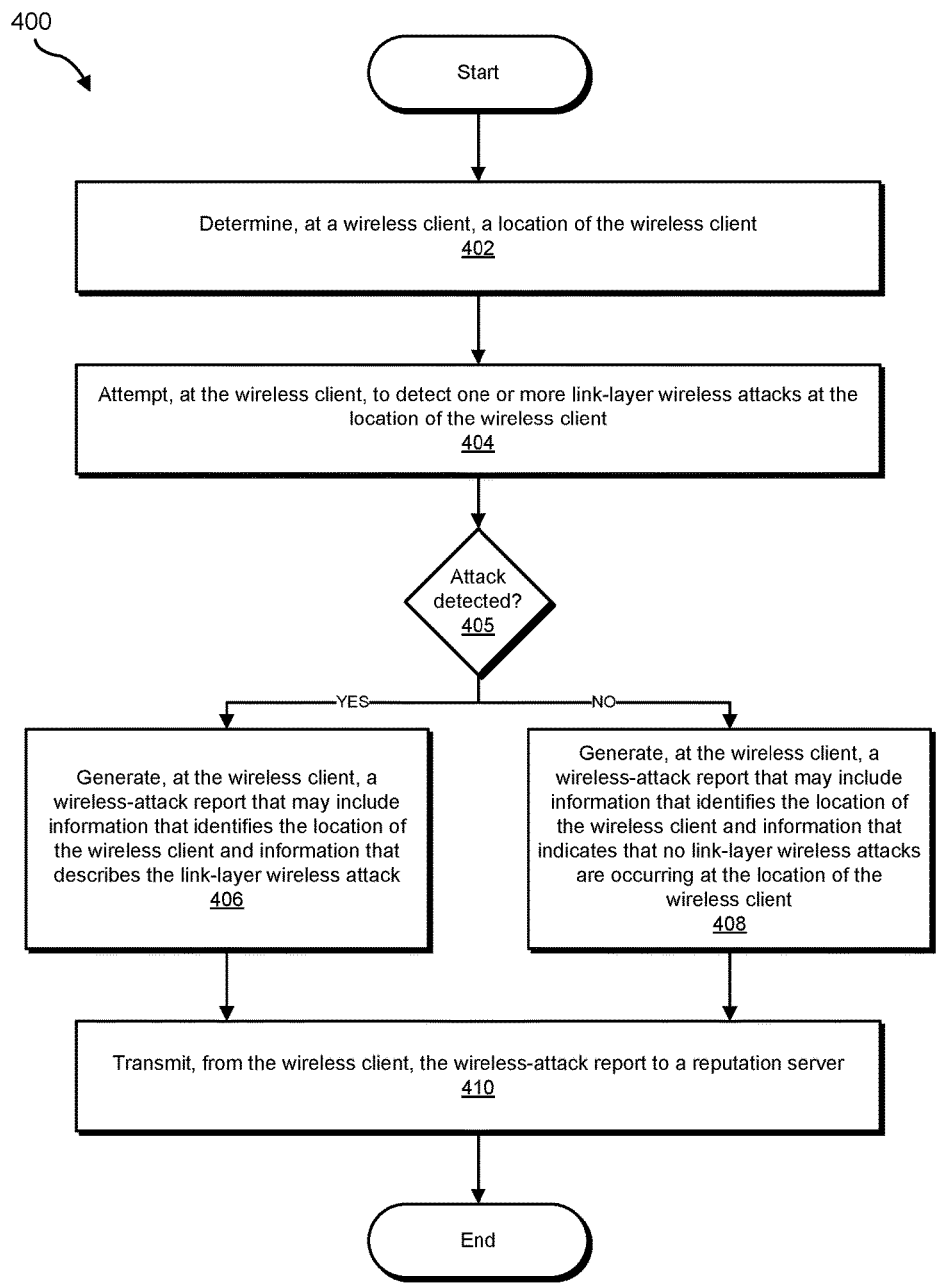
FIG. 4 is a flow diagram of an example method for reporting link-layer wireless attacks.

In some examples, attack-detecting module 112 may, as part of one or more wireless clients (e.g., computing device 202), scan for, detect, and report link-layer wireless attacks, and request-receiving module 108 may receive any wireless-attack reports generated by attack-detecting module 112. FIG. 4 is a flow diagram of an example computer-implemented method 400 for reporting link-layer wireless attacks. The steps shown in FIG. 4 may be performed by any suitable computer-executable code and/or computing system, including system 100 in FIG. 1, system 200 in FIG. 2, and/or variations or combinations of one or more of the same. In one example, each of the steps shown in FIG. 4 may represent an algorithm whose structure includes and/or is represented by multiple sub-steps, examples of which will be provided in greater detail below.

At step 402, one or more of the systems described herein may determine, at a wireless client, a location of the wireless client. For example, attack-detecting module 112 may, as part of computing device 202 in FIG. 2, determine location 212.

Attack-detecting module 112 may identify the location of a wireless client in a variety of ways. In one example, attack-detecting module 112 may identify the geographic location of the wireless client by querying a GPS device within the wireless client. Additionally or alternatively, attack-detecting module 112 may analyze cellular-connection location information and/or utilize IP address geolocation based on the WAN internet protocol address of the wireless client. In some examples, attack-detecting module 112 may be unable to directly identify the location of the wireless client. For example, the wireless client may not be equipped with a GPS device or internet protocol geolocation system. In such embodiments, attack-detecting module 112 may identify the geographic location of the wireless client by identifying any or all networks within a range of the wireless client. In some examples, the systems described herein may used the identities of these networks to triangulate the location of the wireless client.

At step 404, one or more of the systems described herein may attempt, at the wireless client, to detect one or more link-layer wireless attacks at the location of the wireless client. For example, attack-detecting module 112 may, as part of computing device 202 in FIG. 2, attempt to detect one or more link-layer wireless attacks at location 212. The systems described herein may perform step 404 in any suitable manner. In one example, attack-detecting module 112 may scan link-layer communications for one or more types of link-layer wireless attacks. In some examples, attack-detecting module 112 may periodically or continually scan link-layer communications for one or more types of link-layer wireless attacks.

From step 404, method 400 may proceed to decision block 405. At decision block 405, one or more of the systems described herein may determine whether any link-layer wireless attacks have been detected at the location. For example, attack-detecting module 112 may, as part of computing device 202 in FIG. 2, determine whether a link-layer wireless attack has been detected at location 212. If the systems described herein determine that a link-layer wireless attack has been detected, method 400 may proceed to step 406. Alternatively, if the systems described herein determine that a link-layer wireless attack has not been detected, processing of method 400 may proceed to step 408.

At step 406, one or more of the systems described herein may generate, at the wireless client, a wireless-attack report that may include information that identifies the location of the wireless client and information that describes the link-layer wireless attack. For example, attack-detecting module 112 may, as part of computing device 202 in FIG. 2, generate wireless-attack report 120 to include location information 214 that identifies the location of computing device 202 (e.g., location 212) and attack information 216 that describes a link-layer wireless attack that was detected at location 212.

The systems described herein may perform step 406 in any suitable manner. In some examples, attack-detecting module 112 may include within a wireless-attack report any information that may be helpful in generating a reputation for a location and/or any information that may be helpful to another wireless computing device to protect itself from link-layer wireless attacks at the location. Examples of information that may be included in a wireless-attack report include, without limitation, the GPS coordinates of a link-layer wireless attack, the time at which the link-layer wireless attack was detected, and/or a type of the link-layer wireless attack.

At step 408, one or more of the systems described herein may generate, at the wireless client, a wireless-attack report that may include information that identifies the location of the wireless client and information that indicates that no link-layer wireless attacks are occurring at the location of the wireless client. For example, attack-detecting module 112 may, as part of computing device 202 in FIG. 2, generate wireless-attack report 120 to include location information 214 that identifies the location of computing device 202 (e.g., location 212) and attack information 216 that describes one or more types of link-layer wireless attacks that were scanned for but not detected at location 212.

The systems described herein may perform step 408 in any suitable manner. In some examples, attack-detecting module 112 may include within a wireless-attack report any information that may be helpful in generating a location's reputation for not having link-layer wireless attacks and/or any information that may be helpful to another wireless computing device to convey the safety of connecting to wireless access points at the location. Examples of information that may be included in a wireless-attack report include, without limitation, the GPS coordinates of a location at which link-layer wireless attacks were scanned for but not detected, the time at which a scan for link-layer wireless attacks was performed, and/or the types of link-layer wireless attacks for which attack-detecting module 112 scanned.

At step 410, one or more of the systems described herein may transmit, from the wireless client, the wireless-attack report to a reputation server. For example, attack-detecting module 112 may, as part of computing device 202 in FIG. 2, transmit wireless-attack report 120 to server 206. Upon completion of step 410, exemplary method 400 in FIG. 4 may terminate.

Returning to FIG. 3, in some situations an attacker may attempt to make false wireless-attack reports. For example, an attacker may attempt to report that no link-layer wireless attacks are occurring at a location while simultaneously perpetrating a link-layer wireless attack at the location. Alternatively, an attacker may attempt to report link-layer wireless attacks at a location when no link-layer wireless attacks have actually occurred or been detected at the location. To combat false reporting, the systems described herein may maintain a reputation for making false reports for each wireless client from which a wireless-attack report is received. In some examples, report-receiving module 104 may assign a bad reputation to a wireless client if wireless-attack reports received from the wireless client to not match or are not corroborated by other wireless clients (e.g., other wireless clients with better reputations). Alternatively, report-receiving module 104 may assign a good reputation to a wireless client if wireless-attack reports received from the wireless client match or are corroborated by other wireless clients.

At step 304, one or more of the systems described herein may use, at the server, the wireless-attack report to generate a reputation for link-layer wireless attacks for the location. For example, reputation-generating module 106 may, as part of server 206 in FIG. 2, use wireless-attack report 120 to generate location reputation 124 for location 212.

Reputation-generating module 106 may perform step 304 in any suitable manner. For example, reputation-generating module 106 may generate a reputation for link-layer wireless attacks for a location based on the number of link-layer wireless attacks that have been reported as having occurred at the location. For example, reputation-generating module 106 may assign a good, safe, or relatively safe reputation to a location if the number of link-layer wireless attacks that have been reported at the location is below a predetermined threshold (e.g., 0). Alternatively, reputation-generating module 106 may assign a bad, unsafe, or relatively unsafe reputation to a location if the number of link-layer wireless attacks that have been reported at the location is above a predetermined threshold.

In some examples, reputation-generating module 106 may generate a time-based reputation for link-layer wireless attacks for a location based on the number of link-layer wireless attacks that have been reported as having occurred at the location during a specific time period (e.g., a prior day, a prior week, a prior month, etc.). For example, reputation-generating module 106 may assign a good, safe, or relatively safe reputation to a location for the last 7 days if the number of link-layer wireless attacks that have been reported at the location during the last 7 days is below a predetermined threshold (e.g., 0). Similarly, reputation-generating module 106 may assign a bad, unsafe, or relatively unsafe reputation to a location for the last 24 hours if the number of link-layer wireless attacks that have been reported at the location during the last 24 hours is above a predetermined threshold.

In some examples, reputation-generating module 106 may generate one or more type-based reputations for a location based on the number of link-layer wireless attacks of one or more types that have been reported as having occurred at the location. For example, reputation-generating module 106 may generate a spoofing-attack reputation for a location based on the number of spoofing attacks that have been reported as having occurred at the location. Additionally or alternatively, reputation-generating module 106 may generate a deauthentication-attack reputation for a location based on the number of deauthentication attacks that have been reported as having occurred at the location.

As mentioned above, the systems described herein may maintain a reputation for making false reports for each wireless client from which a wireless-attack report is received. In these examples, reputation-generating module 106 may generate a reputation for link-layer wireless attacks for a location based only or mostly on wireless-attack reports that were received from wireless clients with good reputations for reporting attacks accurately (e.g., by assigning a greater weight to these wireless-attack reports). Additionally or alternatively, reputation-generating module 106 may generate a reputation for link-layer wireless attacks for a location in a way that ignores or mostly ignores wireless-attack reports that were received from wireless clients with bad reputations for making false reports (e.g., by assigning a lesser weight to these wireless-attack reports). In at least one example, if a wireless client has made more than a predetermined number of false reports, reputation-generating module 106 may disregard any wireless-attack reports that are received from the wireless client.

In some examples, reputation-generating module 106 may update a location's reputation as new wireless-attack reports for the location are received by updating the location's reputation to reflect the new wireless-attack reports. For example, if a location previously had a reputation for having link-layer wireless attacks but new wireless-attack reports indicate that no link-layer wireless attacks have occurred for a certain predetermined amount of time, reputation-generating module 106 may update the location's reputation to a reputation for not having link-layer wireless attacks. Additionally or alternatively, reputation-generating module 106 may update a location's reputation by phasing out wireless-attack reports for the location that are older than a predetermined age. For example, if a location previously had a reputation for having link-layer wireless attacks as a result of many wireless-attack reports indicating link-layer wireless attacks at the location but few if any new wireless-attack reports indicate link-layer wireless attacks at the location, reputation-generating module 106 may update the location's reputation to a reputation for not having or having a small number of link-layer wireless attacks.

At step 306, one or more of the systems described herein may receive, at the server from a second wireless client, a request for the reputation of the location. For example, request-receiving module 108 may, as part of server 206 in FIG. 2, receive, from computing device 203, request 218 for location reputation 124 of location 212. At step 308, one or more of the systems described herein may respond to the request with the reputation of the location. For example, responding module 110 may, as part of server 206 in FIG. 2, respond to request 218 with location reputation 124. Upon completion of step 308, exemplary method 300 in FIG. 3 may terminate.

Figure 5:
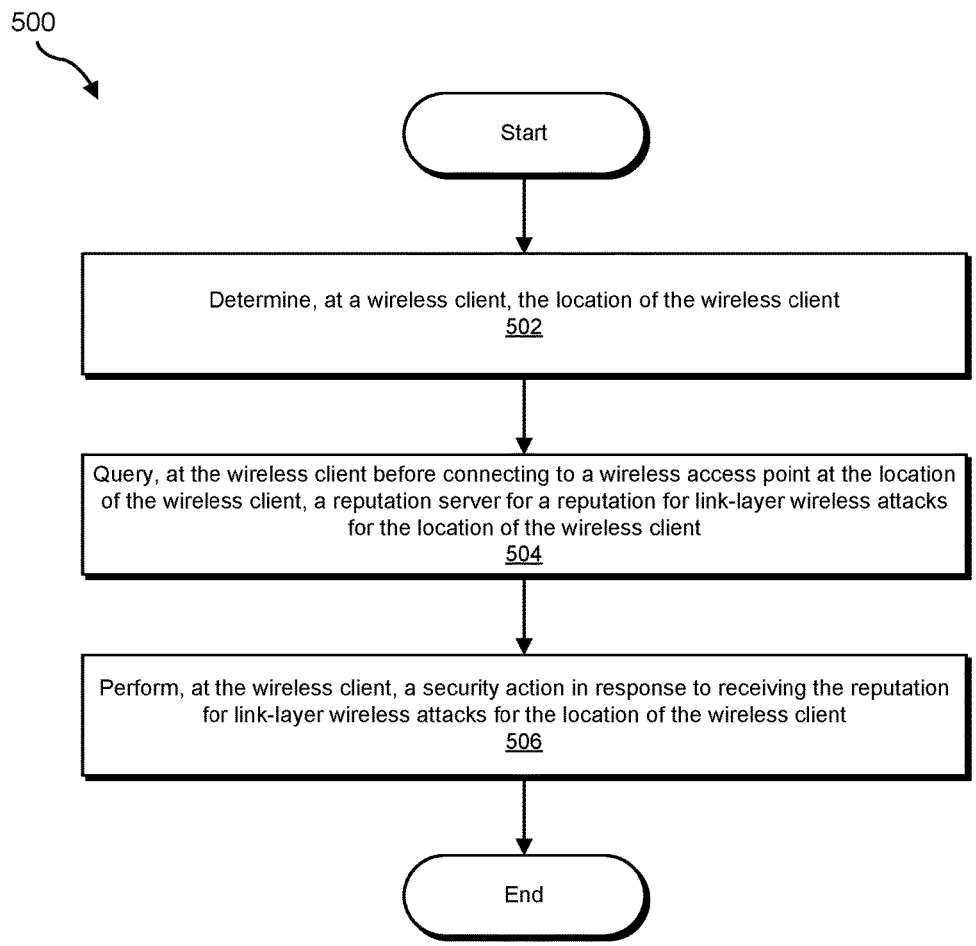
FIG. 5 is a flow diagram of an example method for receiving and reacting to reputations for link-layer wireless attacks.

Wireless clients may react to reputations for link-layer wireless attacks in various ways. FIG. 5 is a flow diagram of an example computer-implemented method 500 for receiving and reacting to reputations for link-layer wireless attacks. The steps shown in FIG. 5 may be performed by any suitable computer-executable code and/or computing system, including system 100 in FIG. 1, system 200 in FIG. 2, and/or variations or combinations of one or more of the same. In one example, each of the steps shown in FIG. 5 may represent an algorithm whose structure includes and/or is represented by multiple sub-steps, examples of which will be provided in greater detail below.

At step 502, one or more of the systems described herein may determine, at a wireless client, the location of the wireless client. For example, security module 114 may, as part of computing device 203 in FIG. 2, determine location 212. Step 502 is similar to step 402 in FIG. 4. Therefore, the previous discussions of step 402 may also apply to step 502.

At step 504, one or more of the systems described herein may query, at the wireless client before connecting to a wireless access point at the location of the wireless client, a reputation server for a reputation for link-layer wireless attacks for the location of the wireless client. For example, security module 114 may, as part of computing device 203 in FIG. 2, query server 206 for a reputation for link-layer wireless attacks for location 212 before connecting to wireless access point 210.

At step 506, one or more of the systems described herein may perform, at the wireless client, a security action in response to receiving the reputation for link-layer wireless attacks for the location of the wireless client. For example, security module 114 may, as part of computing device 203 in FIG. 2, perform a security action in response to receiving location reputation 124.

The systems described herein may perform step 506 in any suitable manner. For example, if security module 114 is installed on a wireless client that receives a bad or unsafe reputation for a location that indicates that link-layer wireless attacks are likely at the location, security module 114 may (i) warn a user of the wireless client of a higher risk of connecting to wireless access points at the location, (ii) provide the user with information that describes the link-layer wireless attacks that are likely to be encountered at the location, (iii) prevent the wireless client from auto connecting to wireless access points at the location, and/or (iv) prevent the wireless client from connecting to any wireless access points at the location. Alternatively, if security module 114 is installed on a wireless client that receives a good or safe reputation for a location that indicates that link-layer wireless attacks are not likely at the location, security module 114 may allow the wireless client to connect to a wireless access point at the location.

In some examples, if security module 114 is installed on a wireless client that receives a bad or unsafe reputation for a location that indicates that a particular type of link-layer wireless attack is likely to occur at the location, security module 114 may perform an appropriate security action to protect the wireless client from the particular type of link-layer wireless attack. For example, if security module 114 is installed on a wireless client that receives a bad or unsafe reputation for a location that indicates that a deauthentication attack is likely to occur at the location, security module 114 may cause the wireless client to ignore some or all of the deauthentication frames that it receives. Upon completion of step 506, exemplary method 500 in FIG. 5 may terminate.

As explained above, by maintaining a location-based reputation for link-layer wireless attacks for a location based on whether one or more wireless clients have or have not detected link-layer wireless attacks at the location, the systems and methods described herein may disseminate the location-based reputations to additional wireless clients that find themselves at the location and that are unsure of the safety of connecting to wireless access points at the location. Furthermore, in some examples, by disseminating a location-based reputation to a wireless client that finds itself at a particular location and needing to connect to a wireless access point, these systems and methods may enable the wireless client to judge whether it is safe to do so.

Figure 6:
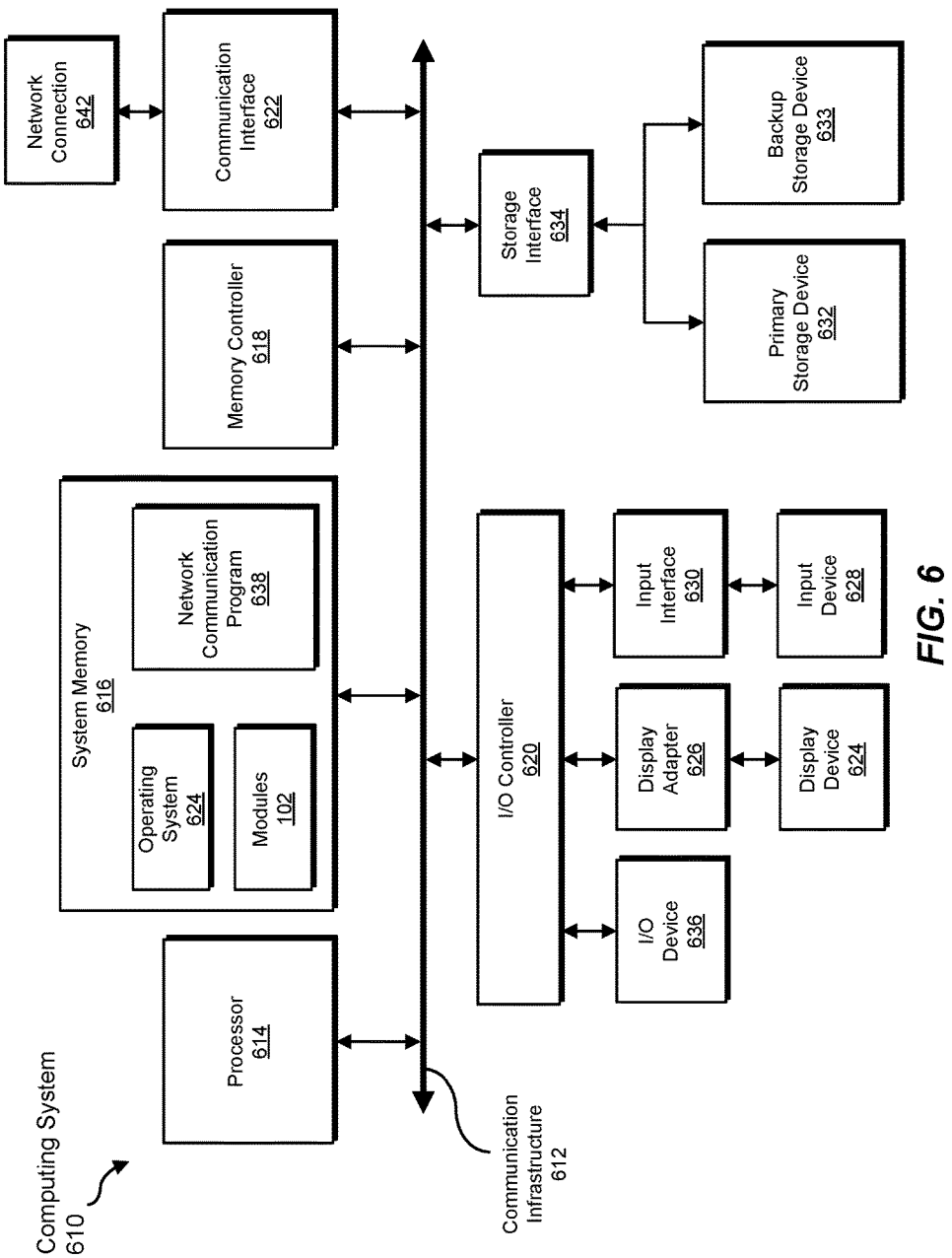
FIG. 6 is a block diagram of an example computing system capable of implementing one or more of the embodiments described and/or illustrated herein.

FIG. 6 is a block diagram of an example computing system 610 capable of implementing one or more of the embodiments described and/or illustrated herein. For example, all or a portion of computing system 610 may perform and/or be a means for performing, either alone or in combination with other elements, one or more of the steps described herein (such as one or more of the steps illustrated in FIG. 3). All or a portion of computing system 610 may also perform and/or be a means for performing any other steps, methods, or processes described and/or illustrated herein.

Computing system 610 broadly represents any single or multi-processor computing device or system capable of executing computer-readable instructions. Examples of computing system 610 include, without limitation, workstations, laptops, client-side terminals, servers, distributed computing systems, handheld devices, or any other computing system or device. In its most basic configuration, computing system 610 may include at least one processor 614 and a system memory 616.

Processor 614 generally represents any type or form of physical processing unit (e.g., a hardware-implemented central processing unit) capable of processing data or interpreting and executing instructions. In certain embodiments, processor 614 may receive instructions from a software application or module. These instructions may cause processor 614 to perform the functions of one or more of the example embodiments described and/or illustrated herein.

System memory 616 generally represents any type or form of volatile or non-volatile storage device or medium capable of storing data and/or other computer-readable instructions. Examples of system memory 616 include, without limitation, Random Access Memory (RAM), Read Only Memory (ROM), flash memory, or any other suitable memory device. Although not required, in certain embodiments computing system 610 may include both a volatile memory unit (such as, for example, system memory 616) and a non-volatile storage device (such as, for example, primary storage device 632, as described in detail below). In one example, one or more of modules 102 from FIG. 1 may be loaded into system memory 616.

In some examples, system memory 616 may store and/or load an operating system 624 for execution by processor 614. In one example, operating system 624 may include and/or represent software that manages computer hardware and software resources and/or provides common services to computer programs and/or applications on computing system 610. Examples of operating system 624 include, without limitation, LINUX, MICROSOFT WINDOWS, WINDOWS MOBILE, MAC OS, APPLE'S 10S, UNIX, GOOGLE CHROME OS, GOOGLE'S ANDROID, SOLARIS, variations of one or more of the same, and/or any other suitable operating system.

In certain embodiments, example computing system 610 may also include one or more components or elements in addition to processor 614 and system memory 616. For example, as illustrated in FIG. 6, computing system 610 may include a memory controller 618, an Input/Output (I/O) controller 620, and a communication interface 622, each of which may be interconnected via a communication infrastructure 612. Communication infrastructure 612 generally represents any type or form of infrastructure capable of facilitating communication between one or more components of a computing device. Examples of communication infrastructure 612 include, without limitation, a communication bus (such as an Industry Standard Architecture (ISA), Peripheral Component Interconnect (PCI), PCI Express (PCIe), or similar bus) and a network.

Memory controller 618 generally represents any type or form of device capable of handling memory or data or controlling communication between one or more components of computing system 610. For example, in certain embodiments memory controller 618 may control communication between processor 614, system memory 616, and I/O controller 620 via communication infrastructure 612.

I/O controller 620 generally represents any type or form of module capable of coordinating and/or controlling the input and output functions of a computing device. For example, in certain embodiments I/O controller 620 may control or facilitate transfer of data between one or more elements of computing system 610, such as processor 614, system memory 616, communication interface 622, display adapter 626, input interface 630, and storage interface 634.

As illustrated in FIG. 6, computing system 610 may also include at least one display device 624 coupled to I/O controller 620 via a display adapter 626. Display device 624 generally represents any type or form of device capable of visually displaying information forwarded by display adapter 626. Similarly, display adapter 626 generally represents any type or form of device configured to forward graphics, text, and other data from communication infrastructure 612 (or from a frame buffer, as known in the art) for display on display device 624.

As illustrated in FIG. 6, example computing system 610 may also include at least one input device 628 coupled to I/O controller 620 via an input interface 630. Input device 628 generally represents any type or form of input device capable of providing input, either computer or human generated, to example computing system 610. Examples of input device 628 include, without limitation, a keyboard, a pointing device, a speech recognition device, variations or combinations of one or more of the same, and/or any other input device.

Additionally or alternatively, example computing system 610 may include additional I/O devices. For example, example computing system 610 may include I/O device 636. In this example, I/O device 636 may include and/or represent a user interface that facilitates human interaction with computing system 610. Examples of I/O device 636 include, without limitation, a computer mouse, a keyboard, a monitor, a printer, a modem, a camera, a scanner, a microphone, a touchscreen device, variations or combinations of one or more of the same, and/or any other I/O device.

Communication interface 622 broadly represents any type or form of communication device or adapter capable of facilitating communication between example computing system 610 and one or more additional devices. For example, in certain embodiments communication interface 622 may facilitate communication between computing system 610 and a private or public network including additional computing systems. Examples of communication interface 622 include, without limitation, a wired network interface (such as a network interface card), a wireless network interface (such as a wireless network interface card), a modem, and any other suitable interface. In at least one embodiment, communication interface 622 may provide a direct connection to a remote server via a direct link to a network, such as the Internet. Communication interface 622 may also indirectly provide such a connection through, for example, a local area network (such as an Ethernet network), a personal area network, a telephone or cable network, a cellular telephone connection, a satellite data connection, or any other suitable connection.

In certain embodiments, communication interface 622 may also represent a host adapter configured to facilitate communication between computing system 610 and one or more additional network or storage devices via an external bus or communications channel. Examples of host adapters include, without limitation, Small Computer System Interface (SCSI) host adapters, Universal Serial Bus (USB) host adapters, Institute of Electrical and Electronics Engineers (IEEE) 1394 host adapters, Advanced Technology Attachment (ATA), Parallel ATA (PATA), Serial ATA (SATA), and External SATA (eSATA) host adapters, Fibre Channel interface adapters, Ethernet adapters, or the like. Communication interface 622 may also allow computing system 610 to engage in distributed or remote computing. For example, communication interface 622 may receive instructions from a remote device or send instructions to a remote device for execution.

In some examples, system memory 616 may store and/or load a network communication program 638 for execution by processor 614. In one example, network communication program 638 may include and/or represent software that enables computing system 610 to establish a network connection 642 with another computing system (not illustrated in FIG. 6) and/or communicate with the other computing system by way of communication interface 622. In this example, network communication program 638 may direct the flow of outgoing traffic that is sent to the other computing system via network connection 642. Additionally or alternatively, network communication program 638 may direct the processing of incoming traffic that is received from the other computing system via network connection 642 in connection with processor 614.

Although not illustrated in this way in FIG. 6, network communication program 638 may alternatively be stored and/or loaded in communication interface 622. For example, network communication program 638 may include and/or represent at least a portion of software and/or firmware that is executed by a processor and/or Application Specific Integrated Circuit (ASIC) incorporated in communication interface 622.

As illustrated in FIG. 6, example computing system 610 may also include a primary storage device 632 and a backup storage device 633 coupled to communication infrastructure 612 via a storage interface 634. Storage devices 632 and 633 generally represent any type or form of storage device or medium capable of storing data and/or other computer-readable instructions. For example, storage devices 632 and 633 may be a magnetic disk drive (e.g., a so-called hard drive), a solid state drive, a floppy disk drive, a magnetic tape drive, an optical disk drive, a flash drive, or the like. Storage interface 634 generally represents any type or form of interface or device for transferring data between storage devices 632 and 633 and other components of computing system 610. In one example, wireless-attack report 120, wireless-attack report 122, location reputation 124, and client reputation 126 from FIG. 1 may be stored and/or loaded in primary storage device 632.

In certain embodiments, storage devices 632 and 633 may be configured to read from and/or write to a removable storage unit configured to store computer software, data, or other computer-readable information. Examples of suitable removable storage units include, without limitation, a floppy disk, a magnetic tape, an optical disk, a flash memory device, or the like. Storage devices 632 and 633 may also include other similar structures or devices for allowing computer software, data, or other computer-readable instructions to be loaded into computing system 610. For example, storage devices 632 and 633 may be configured to read and write software, data, or other computer-readable information. Storage devices 632 and 633 may also be a part of computing system 610 or may be a separate device accessed through other interface systems.

Many other devices or subsystems may be connected to computing system 610. Conversely, all of the components and devices illustrated in FIG. 6 need not be present to practice the embodiments described and/or illustrated herein. The devices and subsystems referenced above may also be interconnected in different ways from that shown in FIG. 6. Computing system 610 may also employ any number of software, firmware, and/or hardware configurations. For example, one or more of the example embodiments disclosed herein may be encoded as a computer program (also referred to as computer software, software applications, computer-readable instructions, or computer control logic) on a computer-readable medium. The term "computer-readable medium," as used herein, generally refers to any form of device, carrier, or medium capable of storing or carrying computer-readable instructions. Examples of computer-readable media include, without limitation, transmission-type media, such as carrier waves, and non-transitory-type media, such as magnetic-storage media (e.g., hard disk drives, tape drives, and floppy disks), optical-storage media (e.g., Compact Disks (CDs), Digital Video Disks (DVDs), and BLU-RAY disks), electronic-storage media (e.g., solid-state drives and flash media), and other distribution systems.

The computer-readable medium containing the computer program may be loaded into computing system 610. All or a portion of the computer program stored on the computer-readable medium may then be stored in system memory 616 and/or various portions of storage devices 632 and 633. When executed by processor 614, a computer program loaded into computing system 610 may cause processor 614 to perform and/or be a means for performing the functions of one or more of the example embodiments described and/or illustrated herein. Additionally or alternatively, one or more of the example embodiments described and/or illustrated herein may be implemented in firmware and/or hardware. For example, computing system 610 may be configured as an Application Specific Integrated Circuit (ASIC) adapted to implement one or more of the example embodiments disclosed herein.

Figure 7:
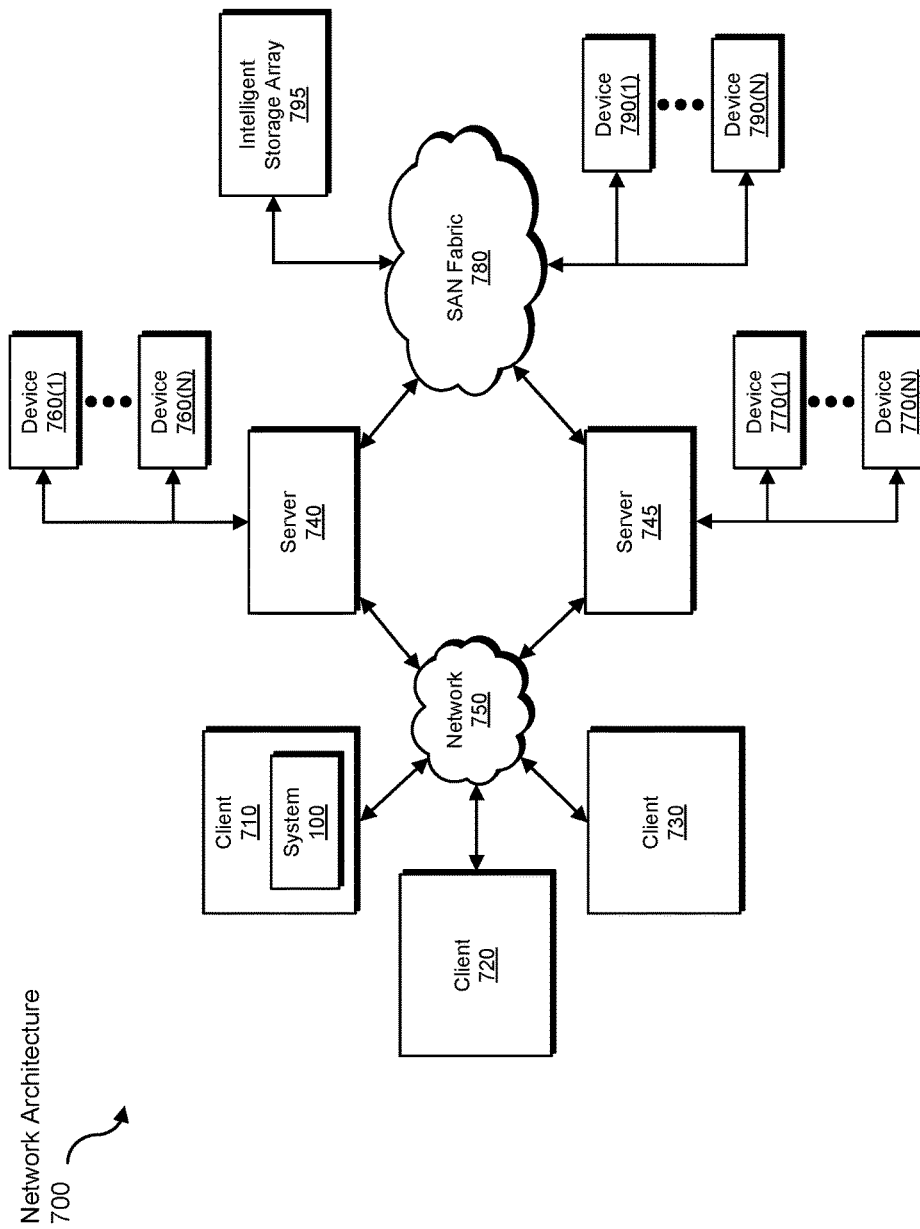
FIG. 7 is a block diagram of an example computing network capable of implementing one or more of the embodiments described and/or illustrated herein.

FIG. 7 is a block diagram of an example network architecture 700 in which client systems 710, 720, and 730 and servers 740 and 745 may be coupled to a network 750. As detailed above, all or a portion of network architecture 700 may perform and/or be a means for performing, either alone or in combination with other elements, one or more of the steps disclosed herein (such as one or more of the steps illustrated in FIG. 3). All or a portion of network architecture 700 may also be used to perform and/or be a means for performing other steps and features set forth in the instant disclosure.

Client systems 710, 720, and 730 generally represent any type or form of computing device or system, such as example computing system 610 in FIG. 6. Similarly, servers 740 and 745 generally represent computing devices or systems, such as application servers or database servers, configured to provide various database services and/or run certain software applications. Network 750 generally represents any telecommunication or computer network including, for example, an intranet, a WAN, a LAN, a PAN, or the Internet. In one example, client systems 710, 720, and/or 730 and/or servers 740 and/or 745 may include all or a portion of system 100 from FIG. 1.

As illustrated in FIG. 7, one or more storage devices 760(1)-(N) may be directly attached to server 740. Similarly, one or more storage devices 770(1)-(N) may be directly attached to server 745. Storage devices 760(1)-(N) and storage devices 770(1)-(N) generally represent any type or form of storage device or medium capable of storing data and/or other computer-readable instructions. In certain embodiments, storage devices 760(1)-(N) and storage devices 770(1)-(N) may represent Network-Attached Storage (NAS) devices configured to communicate with servers 740 and 745 using various protocols, such as Network File System (NFS), Server Message Block (SMB), or Common Internet File System (CIFS).

Servers 740 and 745 may also be connected to a Storage Area Network (SAN) fabric 780. SAN fabric 780 generally represents any type or form of computer network or architecture capable of facilitating communication between a plurality of storage devices. SAN fabric 780 may facilitate communication between servers 740 and 745 and a plurality of storage devices 790(1)-(N) and/or an intelligent storage array 795. SAN fabric 780 may also facilitate, via network 750 and servers 740 and 745, communication between client systems 710, 720, and 730 and storage devices 790(1)-(N) and/or intelligent storage array 795 in such a manner that devices 790(1)-(N) and array 795 appear as locally attached devices to client systems 710, 720, and 730. As with storage devices 760(1)-(N) and storage devices 770(1)-(N), storage devices 790(1)-(N) and intelligent storage array 795 generally represent any type or form of storage device or medium capable of storing data and/or other computer-readable instructions.

In certain embodiments, and with reference to example computing system 610 of FIG. 6, a communication interface, such as communication interface 622 in FIG. 6, may be used to provide connectivity between each client system 710, 720, and 730 and network 750. Client systems 710, 720, and 730 may be able to access information on server 740 or 745 using, for example, a web browser or other client software. Such software may allow client systems 710, 720, and 730 to access data hosted by server 740, server 745, storage devices 760(1)-(N), storage devices 770(1)-(N), storage devices 790(1)-(N), or intelligent storage array 795. Although FIG. 7 depicts the use of a network (such as the Internet) for exchanging data, the embodiments described and/or illustrated herein are not limited to the Internet or any particular network-based environment.

In at least one embodiment, all or a portion of one or more of the example embodiments disclosed herein may be encoded as a computer program and loaded onto and executed by server 740, server 745, storage devices 760(1)-(N), storage devices 770(1)-(N), storage devices 790(1)-(N), intelligent storage array 795, or any combination thereof. All or a portion of one or more of the example embodiments disclosed herein may also be encoded as a computer program, stored in server 740, run by server 745, and distributed to client systems 710, 720, and 730 over network 750.

As detailed above, computing system 610 and/or one or more components of network architecture 700 may perform and/or be a means for performing, either alone or in combination with other elements, one or more steps of an example method for disseminating location-based reputations for link-layer wireless attacks.

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered example in nature since many other architectures can be implemented to achieve the same functionality.

In some examples, all or a portion of example system 100 in FIG. 1 may represent portions of a cloud-computing or network-based environment. Cloud-computing environments may provide various services and applications via the Internet. These cloud-based services (e.g., software as a service, platform as a service, infrastructure as a service, etc.) may be accessible through a web browser or other remote interface. Various functions described herein may be provided through a remote desktop environment or any other cloud-based computing environment.

In various embodiments, all or a portion of example system 100 in FIG. 1 may facilitate multi-tenancy within a cloud-based computing environment. In other words, the software modules described herein may configure a computing system (e.g., a server) to facilitate multi-tenancy for one or more of the functions described herein. For example, one or more of the software modules described herein may program a server to enable two or more clients (e.g., customers) to share an application that is running on the server. A server programmed in this manner may share an application, operating system, processing system, and/or storage system among multiple customers (i.e., tenants). One or more of the modules described herein may also partition data and/or configuration information of a multi-tenant application for each customer such that one customer cannot access data and/or configuration information of another customer.

According to various embodiments, all or a portion of example system 100 in FIG. 1 may be implemented within a virtual environment. For example, the modules and/or data described herein may reside and/or execute within a virtual machine. As used herein, the term "virtual machine" generally refers to any operating system environment that is abstracted from computing hardware by a virtual machine manager (e.g., a hypervisor). Additionally or alternatively, the modules and/or data described herein may reside and/or execute within a virtualization layer. As used herein, the term "virtualization layer" generally refers to any data layer and/or application layer that overlays and/or is abstracted from an operating system environment. A virtualization layer may be managed by a software virtualization solution (e.g., a file system filter) that presents the virtualization layer as though it were part of an underlying base operating system. For example, a software virtualization solution may redirect calls that are initially directed to locations within a base file system and/or registry to locations within a virtualization layer.

In some examples, all or a portion of example system 100 in FIG. 1 may represent portions of a mobile computing environment. Mobile computing environments may be implemented by a wide range of mobile computing devices, including mobile phones, tablet computers, e-book readers, personal digital assistants, wearable computing devices (e.g., computing devices with a head-mounted display, smartwatches, etc.), and the like. In some examples, mobile computing environments may have one or more distinct features, including, for example, reliance on battery power, presenting only one foreground application at any given time, remote management features, touchscreen features, location and movement data (e.g., provided by Global Positioning Systems, gyroscopes, accelerometers, etc.), restricted platforms that restrict modifications to system-level configurations and/or that limit the ability of third-party software to inspect the behavior of other applications, controls to restrict the installation of applications (e.g., to only originate from approved application stores), etc. Various functions described herein may be provided for a mobile computing environment and/or may interact with a mobile computing environment.

In addition, all or a portion of example system 100 in FIG. 1 may represent portions of, interact with, consume data produced by, and/or produce data consumed by one or more systems for information management. As used herein, the term "information management" may refer to the protection, organization, and/or storage of data. Examples of systems for information management may include, without limitation, storage systems, backup systems, archival systems, replication systems, high availability systems, data search systems, virtualization systems, and the like.

In some embodiments, all or a portion of example system 100 in FIG. 1 may represent portions of, produce data protected by, and/or communicate with one or more systems for information security. As used herein, the term "information security" may refer to the control of access to protected data. Examples of systems for information security may include, without limitation, systems providing managed security services, data loss prevention systems, identity authentication systems, access control systems, encryption systems, policy compliance systems, intrusion detection and prevention systems, electronic discovery systems, and the like.

According to some examples, all or a portion of example system 100 in FIG. 1 may represent portions of, communicate with, and/or receive protection from one or more systems for endpoint security. As used herein, the term "endpoint security" may refer to the protection of endpoint systems from unauthorized and/or illegitimate use, access, and/or control. Examples of systems for endpoint protection may include, without limitation, anti-malware systems, user authentication systems, encryption systems, privacy systems, spam-filtering services, and the like.

The process parameters and sequence of steps described and/or illustrated herein are given by way of example only and can be varied as desired. For example, while the steps illustrated and/or described herein may be shown or discussed in a particular order, these steps do not necessarily need to be performed in the order illustrated or discussed. The various example methods described and/or illustrated herein may also omit one or more of the steps described or illustrated herein or include additional steps in addition to those disclosed.

While various embodiments have been described and/or illustrated herein in the context of fully functional computing systems, one or more of these example embodiments may be distributed as a program product in a variety of forms, regardless of the particular type of computer-readable media used to actually carry out the distribution. The embodiments disclosed herein may also be implemented using software modules that perform certain tasks. These software modules may include script, batch, or other executable files that may be stored on a computer-readable storage medium or in a computing system. In some embodiments, these software modules may configure a computing system to perform one or more of the example embodiments disclosed herein.

In addition, one or more of the modules described herein may transform data, physical devices, and/or representations of physical devices from one form to another. For example, one or more of the modules recited herein may receive one or more wireless-attack reports for a location, transform the one or more wireless-attack reports into a reputation for the location, output a result of the transformation to a wireless client, use the result of the transformation to determine whether it is safe to connect to wireless access points at the location, and store the result of the transformation to a reputation storage system. Additionally or alternatively, one or more of the modules recited herein may transform a processor, volatile memory, non-volatile memory, and/or any other portion of a physical computing device from one form to another by executing on the computing device, storing data on the computing device, and/or otherwise interacting with the computing device.

The preceding description has been provided to enable others skilled in the art to best utilize various aspects of the example embodiments disclosed herein. This example description is not intended to be exhaustive or to be limited to any precise form disclosed. Many modifications and variations are possible without departing from the spirit and scope of the instant disclosure. The embodiments disclosed herein should be considered in all respects illustrative and not restrictive. Reference should be made to the appended claims and their equivalents in determining the scope of the instant disclosure.

Unless otherwise noted, the terms "connected to" and "coupled to" (and their derivatives), as used in the specification and claims, are to be construed as permitting both direct and indirect (i.e., via other elements or components) connection. In addition, the terms "a" or "an," as used in the specification and claims, are to be construed as meaning "at least one of." Finally, for ease of use, the terms "including" and "having" (and their derivatives), as used in the specification and claims, are interchangeable with and have the same meaning as the word "comprising."

What is claimed is:

1. A computer-implemented method for disseminating location-based reputations for link-layer wireless attacks, at least a portion of the method being performed by a computing device comprising at least one processor, the method comprising:
  monitoring, at a first wireless client, for at least one of:
    a wireless-access-point spoofing attack by a malicious device attempting to spoof a legitimate wireless access point known to the first wireless client; or a deauthentication attack by a malicious device attempting to disconnect the first wireless client from the legitimate wireless access point;

determining, at the first wireless client, a geographic location of the first wireless client;

transmitting, from the first wireless client to a server, a wireless-attack report for the geographic location, wherein the wireless-attack report comprises one of:
 information that indicates that the first wireless client detected the wireless-access-point spoofing attack or the deauthentication attack at the geographic location; or
 information that indicates that the first wireless client did not detect any wireless-access-point spoofing attacks or deauthentication attacks at the geographic location;

receiving, at the server from the first wireless client, the wireless-attack report for the geographic location;

using, at the server, the wireless-attack report to generate, for the geographic location, a reputation for wireless-access-point spoofing attacks or deauthentication attacks for the geographic location comprising at least one of:
 the geographic location's reputation for having wireless-access-point spoofing attacks;
 the geographic location's reputation for having deauthentication attacks;
 the geographic location's reputation for not having wireless-access-point spoofing attacks; or
 the geographic location's reputation for not having deauthentication attacks;

receiving, at the server from a second wireless client, a request for the reputation of the geographic location; and responding to the request with the reputation of the geographic location.

2. The computer-implemented method of claim 1, further comprising:
 detecting, at the first wireless client, the wireless-access-point spoofing attack or the deauthentication attack; and
 generating, at the first wireless client, the wireless-attack report that comprises:
  information that identifies the geographic location of the first wireless client; and
  information that describes the wireless-access-point spoofing attack or the deauthentication attack.

3. The computer-implemented method of claim 1, further comprising:
 determining, at the first wireless client, that no wireless-access-point spoofing attacks or deauthentication attacks are occurring at the geographic location of the first wireless client; and
 generating, at the first wireless client, the wireless-attack report that comprises:
  information that identifies the geographic location of the first wireless client; and
  information that indicates that no wireless-access-point spoofing attacks or deauthentication attacks are occurring at the geographic location of the first wireless client.

4. The computer-implemented method of claim 1, further comprising:
 determining, at the second wireless client, the geographic location of the second wireless client;
 querying, at the second wireless client before connecting to a wireless access point at the geographic location of the second wireless client, the server for a reputation for wireless-access-point spoofing attacks or deauthentication attacks for the geographic location of the second wireless client; and
 performing, at the second wireless client, a security action in response to receiving a poor reputation for the geographic location of the second wireless client.

5. The computer-implemented method of claim 4, wherein performing the security action comprises warning a user of the second wireless client of a risk of connecting to the wireless access point.

6. The computer-implemented method of claim 4, wherein performing the security action comprises preventing the second wireless client from auto connecting to the wireless access point.

7. The computer-implemented method of claim 4, wherein performing the security action comprises preventing the second wireless client from connecting to the wireless access point.

8. The computer-implemented method of claim 1, further comprising:
 determining, at the second wireless client, the geographic location of the second wireless client;
 querying, at the second wireless client before connecting to a wireless access point at the geographic location of the second wireless client, the server for a reputation for wireless-access-point spoofing attacks or deauthentication attacks for the geographic location of the second wireless client; and
 connecting, at the second wireless client, to the wireless access point in response to receiving a good reputation for the geographic location of the second wireless client.

9. The computer-implemented method of claim 1, further comprising receiving, at the server from one or more additional wireless clients, one or more additional wireless-attack reports for the geographic location, wherein using the wireless-attack report to generate the reputation for the geographic location comprises using, at the server, the one or more additional wireless-attack reports to generate the reputation for the geographic location.

10. The computer-implemented method of claim 1, further comprising maintaining, at the server, a reputation for making false reports for the first wireless client, wherein the wireless-attack report is used to generate the reputation for wireless-access-point spoofing attacks or deauthentication attacks for the geographic location based at least in part on the reputation of the first wireless client indicating that the first wireless client does not make false reports of wireless-access-point spoofing attacks or deauthentication attacks.

11. The computer-implemented method of claim 1, further comprising detecting, at the first wireless client, the wireless-access-point spoofing attack.

12. The computer-implemented method of claim 1, further comprising detecting, at the first wireless client, the deauthentication attack.

13. A system for disseminating location-based reputations for link-layer wireless attacks, the system comprising:
 an attack-detecting module, stored in memory, that:
  monitors, at a first wireless client, for at least one of:
   a wireless-access-point spoofing attack by a malicious device attempting to spoof a legitimate wireless access point known to the first wireless client; or
   a deauthentication attack by a malicious device attempting to disconnect the first wireless client from the legitimate wireless access point;

determines, at the first wireless client, a geographic location of the first wireless client; and
transmits, from the first wireless client, a wireless-attack report for the geographic location, wherein the wireless-attack report comprises one of:
information that indicates that the first wireless client detected the wireless-access-point spoofing attack or the deauthentication attack at the geographic location; or
information that indicates that the first wireless client did not detect any wireless-access-point spoofing attacks or deauthentication attacks at the geographic location;
a report-receiving module, stored in memory, that receives, at the server from the first wireless client, the wireless-attack report;
a reputation-generating module, stored in memory, that uses, at the server, the wireless-attack report to generate a reputation for wireless-access-point spoofing attacks or deauthentication attacks for the geographic location comprising at least one of:
the geographic location's reputation for having wireless-access-point spoofing attacks;
the geographic location's reputation for having deauthentication attacks;
the geographic location's reputation for not having wireless-access-point spoofing attacks; or
the geographic location's reputation for not having deauthentication attacks;
a request-receiving module, stored in memory, that receives, at the server from a second wireless client, a request for the reputation of the geographic location;
a responding module, stored in memory, that responds to the request with the reputation of the geographic location; and
at least one physical processor that executes the attack-detecting module, the report-receiving module, the reputation-generating module, the request-receiving module, and the responding module.

14. The system of claim 13, wherein the attack-detecting module further:
detects, at the first wireless client, the wireless-access-point spoofing attack or the deauthentication attack;
generates, at the first wireless client, the wireless-attack report that comprises:
information that identifies the geographic location of the first wireless client; and
information that describes the wireless-access-point spoofing attack or the deauthentication attack.

15. The system of claim 13, wherein the attack-detecting module further:
attempts, at the first wireless client, to detect one or more wireless-access-point spoofing attacks or deauthentication attacks at the geographic location of the first wireless client;
determines, at the first wireless client, that no wireless-access-point spoofing attacks or deauthentication attacks are occurring at the geographic location of the first wireless client;
generates, at the first wireless client, the wireless-attack report that comprises:
information that identifies the geographic location of the first wireless client; and
information that indicates that no wireless-access-point spoofing attacks or deauthentication attacks are occurring at the geographic location of the first wireless client.

16. The system of claim 13, further comprising a security module, stored in memory, that:
determines, at the second wireless client, the geographic location of the second wireless client;
queries, at the second wireless client before connecting to a wireless access point at the geographic location of the second wireless client, the server for a reputation for wireless-access-point spoofing attacks or deauthentication attacks for the geographic location of the second wireless client; and
performs, at the second wireless client, a security action in response to receiving a poor reputation for wireless-access-point spoofing attacks or deauthentication attacks for the geographic location of the second wireless client.

17. The system of claim 16, wherein the security module performs the security action by warning a user of the second wireless client of a risk of connecting to the wireless access point.

18. The system of claim 16, wherein the security module performs the security action by preventing the second wireless client from auto connecting to the wireless access point.

19. The system of claim 16, wherein the security module performs the security action by preventing the second wireless client from connecting to the wireless access point.

20. A non-transitory computer-readable medium comprising one or more computer-executable instructions that, when executed by at least one processor of a computing device, cause the computing device to:
receive, at a server from a first wireless client, a wireless-attack report for a geographic location, wherein the wireless-attack report comprises one of:
information that indicates that the first wireless client detected at least one of:
a wireless-access-point spoofing attack at the geographic location by a malicious device attempting to spoof a legitimate wireless access point known to the first wireless client; or
a deauthentication attack at the geographic location by a malicious device attempting to disconnect the first wireless client from the legitimate wireless access point;
information that indicates that the first wireless client did not detect any wireless-access-point spoofing attacks or deauthentication attacks at the geographic location;
use, at the server, the wireless-attack report to generate a reputation for wireless-access-point spoofing attacks or deauthentication attacks for the geographic location comprising at least one of:
the geographic location's reputation for having wireless-access-point spoofing attacks;
the geographic location's reputation for having deauthentication attacks;
the geographic location's reputation for not having wireless-access-point spoofing attacks; or
the geographic location's reputation for not having deauthentication attacks;
receive, at the server from a second wireless client, a request for the reputation of the geographic location; and
respond to the request with the reputation of the geographic location.

* * * * *